(12) United States Patent
Ballai et al.

(10) Patent No.: US 10,015,561 B2
(45) Date of Patent: Jul. 3, 2018

(54) SYSTEM AND METHOD FOR REAL-TIME MARKETING USING CONVENTIONAL SCENE / TIMING METADATA-EMBEDDED VIDEO

(71) Applicant: Oohly, LLC, Leawood, KS (US)

(72) Inventors: Bruce W. Ballai, Leawood, KS (US); Jason Michael Bogner, Omaha, NE (US)

(73) Assignee: Oohly, LLC, Leawood, KS (US)

( * ) Notice: Subject to any disclaimer, the term of this patent is extended or adjusted under 35 U.S.C. 154(b) by 0 days.

(21) Appl. No.: 13/760,792

(22) Filed: Feb. 6, 2013

(65) Prior Publication Data

US 2013/0205336 A1 Aug. 8, 2013

Related U.S. Application Data

(60) Provisional application No. 61/595,465, filed on Feb. 6, 2012.

(51) Int. Cl.
| | |
|---|---|
| H04N 21/81 | (2011.01) |
| H04N 21/41 | (2011.01) |
| H04N 21/433 | (2011.01) |
| H04N 21/235 | (2011.01) |
| H04N 21/231 | (2011.01) |
| H04N 21/40 | (2011.01) |

(Continued)

(52) U.S. Cl.
CPC ....... *H04N 21/812* (2013.01); *G06Q 30/0241* (2013.01); *H04N 21/23* (2013.01); *H04N 21/231* (2013.01); *H04N 21/234* (2013.01); *H04N 21/235* (2013.01); *H04N 21/2353* (2013.01); *H04N 21/23418* (2013.01); *H04N 21/40* (2013.01); *H04N 21/41* (2013.01); *H04N 21/4135* (2013.01); *H04N 21/43* (2013.01); *H04N 21/4334* (2013.01); *H04N 21/43622* (2013.01); *H04N 21/44* (2013.01); *H04N 21/442* (2013.01); *H04N 21/4722* (2013.01); *H04N 21/47815* (2013.01); *H04N 21/6581* (2013.01); *H04N 21/8133* (2013.01); *H04N 21/858* (2013.01); *H04N 21/8586* (2013.01)

(58) Field of Classification Search
None
See application file for complete search history.

(56) References Cited

U.S. PATENT DOCUMENTS

| | | |
|---|---|---|
| 6,188,398 B1 | 2/2001 | Collins-Rector et al. |
| 7,234,155 B1 | 6/2007 | Kay et al. |

(Continued)

*Primary Examiner* — Justin Shepard
(74) *Attorney, Agent, or Firm* — Lathrop Gage L.L.P.

(57) ABSTRACT

A system and method for identifying an item in a video program including associated metadata. In operation, the correspondence between product information identifying the item, and a scene depicted in the video program in which the product appears, is stored in a database. The associated metadata, previously embedded in the video program, is also copied to the database, and indicates a correspondence between each said scene depicted in the program and the location therein of the scene. A specific scene of interest in the video program is identified by reference to the metadata in the database, and the item in the specific scene is then identified by correlating the metadata for the specific scene with the product information stored in the database, using the stored product/scene correspondence.

21 Claims, 4 Drawing Sheets

(51) Int. Cl.
*H04N 21/23* (2011.01)
*H04N 21/234* (2011.01)
*H04N 21/442* (2011.01)
*H04N 21/43* (2011.01)
*H04N 21/436* (2011.01)
*H04N 21/44* (2011.01)
*H04N 21/4722* (2011.01)
*H04N 21/478* (2011.01)
*H04N 21/658* (2011.01)
*H04N 21/858* (2011.01)
*G06Q 30/02* (2012.01)

(56) References Cited

U.S. PATENT DOCUMENTS

| | | | |
|---|---|---|---|
| 8,121,843 B2* | 2/2012 | Rhoads et al. | 704/270.1 |
| 8,205,223 B2* | 6/2012 | Pack | H04N 21/8586 725/112 |
| 8,582,954 B2* | 11/2013 | Watson et al. | 386/248 |
| 2003/0110485 A1* | 6/2003 | Lu | G06Q 30/04 725/9 |
| 2004/0019524 A1 | 1/2004 | Marshall | |
| 2007/0172155 A1 | 7/2007 | Guckenberger | |
| 2008/0098425 A1 | 4/2008 | Welch | |
| 2008/0109841 A1 | 5/2008 | Heather et al. | |
| 2009/0106804 A1* | 4/2009 | Bhogal | H04N 7/17318 725/110 |
| 2009/0150927 A1* | 6/2009 | Kouhi et al. | 725/34 |
| 2009/0313324 A1* | 12/2009 | Brooks | H04N 21/235 709/203 |
| 2009/0328125 A1* | 12/2009 | Gits et al. | 725/118 |
| 2011/0247042 A1* | 10/2011 | Mallinson | G06F 17/30026 725/86 |
| 2011/0273586 A1* | 11/2011 | Ohnishi | G11B 27/034 348/231.1 |

\* cited by examiner

SYSTEM AND METHOD FOR REAL-TIME MARKETING USING CONVENTIONAL SCENE / TIMING METADATA-EMBEDDED VIDEO

RELATED APPLICATION

This application claims priority to U.S. Provisional Patent Application 61/595,465, filed Feb. 6, 2012, the disclosure of which is incorporated herein by reference.

BACKGROUND/PROBLEM TO BE SOLVED

Previous efforts at marketing products through use of embedded indicia in video media fall into four general categories:

conventional advertising (which interrupts programming and which is believed by most industry experts to be an increasingly less desirable form of advertising);

product placement (which can be politically sensitive as many feel they should be clearly and immediately on notice of what is or may be advertising as opposed to merely part of the video costumes, props and sets; and which is currently the subject of increasing regulatory scrutiny);

embedded specialty marketing, in which a specific advertisement in any one of a number of formats may be previously created and loaded into the video and then selected and accessed by the viewer, assuming the viewer is sufficiently interested in the product to elect to view advertising material either while the entertainment video is on pause or simultaneously continuing; and targeted advertising (in which participation by the viewer in social media Internet based activities, or in other Internet based activities or product selection choices made by that viewer intentionally or inadvertently, provides information about potential needs or product predilections of the viewer to advertisers, and then pre-screened advertising targeted based on this information is sent to that viewer) via different formats (typically Internet pop ups, selected Internet banner ads, and unsolicited email) targeted at the purported needs of that viewer.

SUMMARY/SOLUTION TO THE PROBLEM

Embodiments of the present system create the ability to broadcast or otherwise make available, in the context of entertainment, educational, or other video, any marketing type of information relating to a given product by automatically linking any embedded item to a searchable database from which a viewer can immediately obtain information about the product or purchase it over the Internet without any need to interrupt or interfere with the programming (unless the viewer actively chooses to pause that activity), and allows the content producer the opportunity to make available additional information of their choosing, such as whether the product was embedded as a placed product.

The present method avoids any need to target advertising or to speculate on or infer any particular interest in retail conversion, does not need to interrupt the program, keeps the decision to research and/or shop in the hands of the viewer, and does not incentivize the producer of the video content to change or modify or skew the contents of the video in any way to highlight the item in question, allowing total focus on the quality of the programming without any need to sacrifice any of that quality for advertising purposes.

The content producer may retain the value of their video as a showcase or context for marketing products, and not see it eroded by targeted advertising efforts of others who may not want or need to pay for that enhanced value to their advertising efforts, thereby eliminating potential (or actual) economic "free-riders" from the relationship between vendors and video content producers, making that relationship more economically efficient.

The viewer retains the choice as to whether to consider items within the context of entertainment video as items to be researched and/or considered for retail conversion, or to disregard those opportunities in favor of the single activity of watching the video for whatever original purpose the viewer may have had, free from the distraction of alternative marketing approaches. The viewer retains control over whether the activity of viewing entertainment video is for research and/or consideration of an item for retail conversion . . . or whether the activity of viewing entertainment video is purely for enjoyment and/or education. The viewer, who is able to both research and, if desired, purchase the selected items previously entered into the system database, has the choice of activating or deactivating the service to prevent unwanted access, as in the case of small children.

Vendor Internet websites are made be accessible to the viewer simultaneously during viewing of a particular program, in pause mode or while the program continues. Vendors may, for example, pay for the service by a simple, ordinary pay per click (PPC) mechanism, with pricing established by competitive bidding on prioritization in the search results, also known as premium ranking. The video's content producer and the system service provider may share in the revenue from the PPCs, and the content producer may also be the beneficiary of enhanced leverage in their product placement and paid advertising profit centers (simply because products seen within the context of the entertainment video, and being used or enjoyed by media personalities, are being made available for immediate research and conversion, a significant and valuable benefit afforded to advertisers and product placement marketers that was not previously available in the prior art). That is, the advertising dollars and product placement dollars may have more impact than previously because now items both advertised, and embedded, in the video or in context of the video may be available for immediate research and/or conversion by the viewers.

The present system provides a viewer with the previously unknown capability of immediate access to information regarding items or things which are seen, heard, referenced, or otherwise experienced in a video, such as articles of clothing, props, and sets. It provides the viewer with the capability of immediately researching information regarding the item, and of making an immediate Internet purchase of the item, without pausing the video. The system provides the vendor an opportunity to market and sell their items at the retail level immediately upon their being effectively showcased or displayed in the context of entertainment, educational, or other video, which both displays the items in a unique and potentially more natural or revealing environment and with the marketing enhanced value of the 'social authority' or 'star power' of the media personalities associated with the item in that venue; and it provides the content producers with a novel and unique opportunity to leverage the value of their video content for monetizing the marketing value of that video content in its most immediate and powerful format—in direct association with the marketed items—all of which is accomplished with minimal or no interference with enjoyment of the video itself.

The present system facilitates this process while eliminating both the need to manipulate the dialogue or visual content of the entertainment video to showcase or highlight any given item to be marketed as all marketing information can be discretely accessed via the system without any need to contain that type of information within the video itself, which provides artistic freedom to the creators of the video content, eliminates interference with the viewers' enjoyment of the video, and further provides the content producers with the capability of providing any legally required information or information they otherwise desired to provide to the viewers with respect to the item (e.g., whether or not that item was embedded in the video as a result of 'product placement', i.e., whether advertising dollars were exchanged in return for the embedding or use of that item in the video, or if the item were provided for free by the vendor or manufacturer in exchange for its inclusion in the entertainment video).

In addition, the present system gives the video content provider the capability of making any item that is included in their costumes, props and sets available for immediate research and/or Internet based retail conversion from Internet based retail vendors, in exchange for economic support of the system by those vendors, in a PPC (or other pricing structure) model format. This Internet-based system transforms entertainment video into a research tool, a database, and a virtual Internet retail catalogue through the use of a combination of a computer and Internet based machine-like processes involving a unique and novel combination of mechanical, electrical, and software activities, and a unique and novel economic model which is mutually beneficial to the participants and which effectively and efficiently supports and incentivizes these activities.

In one embodiment, the present system and method identifies an item in a video program which includes associated metadata. In operation, the correspondence between product information identifying the item, and a scene depicted in the video program in which the product appears, is stored in a database. The associated metadata, previously embedded in the video program, is also copied to the database, and indicates a correspondence between each said scene depicted in the program and the location therein of the scene. A specific scene of interest in the video program is identified by reference to the metadata in the database, and the item in the specific scene is then identified by correlating the metadata for the specific scene with the product information stored in the database, using the stored product/scene correspondence.

DETAILED DESCRIPTION

The term "video", as used herein, includes all video information content and associated information including live video transmission, as well as video information stored on previously recorded video media, including sources of pre-recorded electronically stored video information, such as a DVD or other computer-readable media. In the present document, the term "video" includes video programming or programs, such as television programs, and may also include metadata associated with the video information.

The term "metadata", as used herein, identifies a first dataset, embedded in video media and logically associated with a second dataset via a known correspondence, which describes some aspect of the second dataset.

Figure 1:
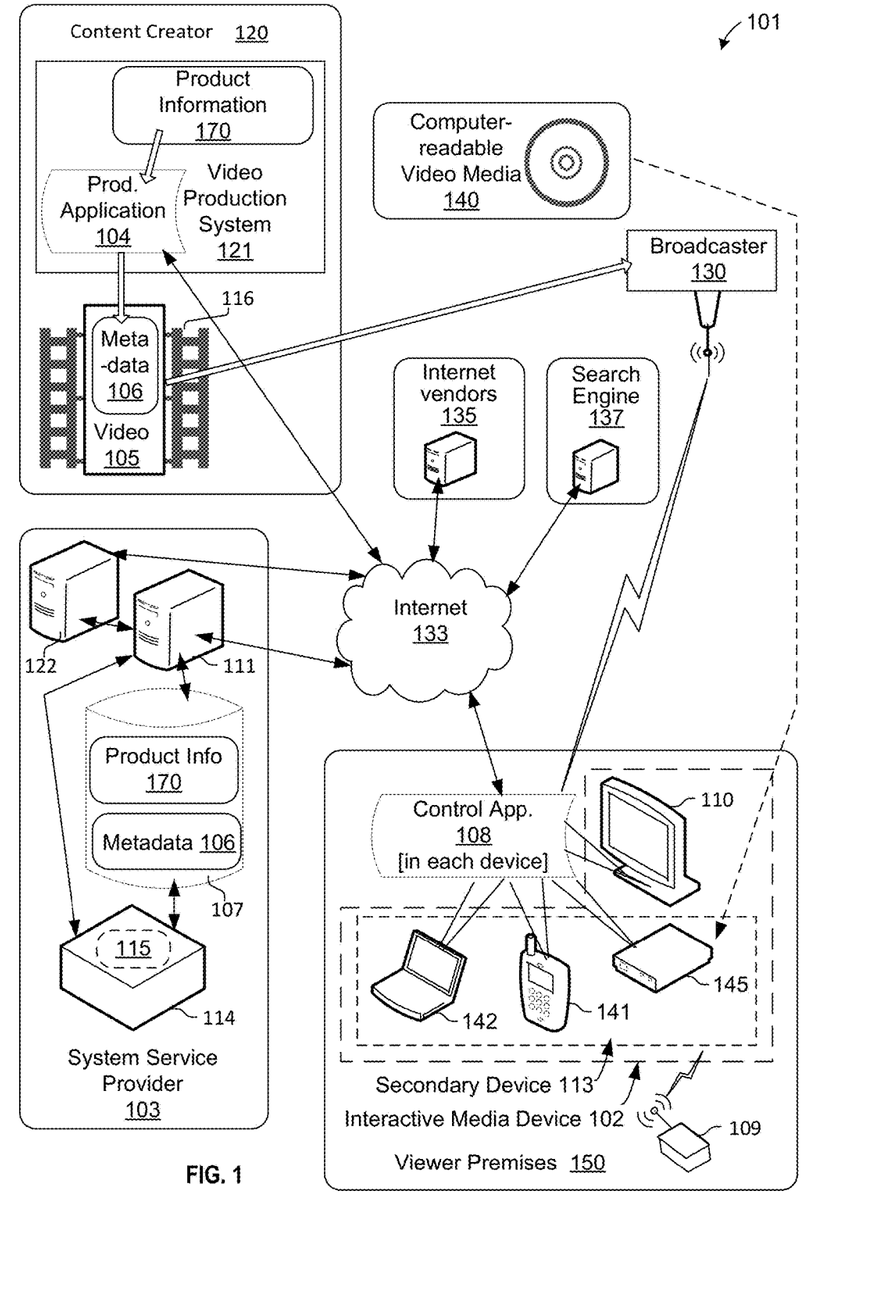
FIG. 1 is a diagram of exemplary components of the present system.

FIG. 1 is a diagram of exemplary components of the present system for real-time marketing using scene/timing metadata-embedded video 105. As shown in FIG. 1, one embodiment of the present system comprises an Internet-based system 101 further comprising a system service provider computer system 103, broadcast video 105 or recorded media 140; an interactive media device 102 providing communication with the system service provider's application servers 111 (one or more), a content creator site 120 including a video production system 121 with a software module ("production application") 104 for loading (receiving) certain scene-related data, an optional media device remote controller 109, a database 107, and a communication and control application 108. These entities are described in further detail below.

Video 105 may be broadcast or cable television (live or 'streaming') entertainment video programming, as well as educational or other video. Video 105 may also be stored on any suitable type of video media 116 for subsequent playback. Interactive media device 102 includes hardware which uses a communication and control application ("control app", or simply "app") 108, described below, to allow the device to communicate with service provider system 103 via the provider's servers 111 and the Internet 133. Interactive media device 102 may be, for example, a device such as a 'smart' or Internet-enabled television set (e.g., ITV 110), a PC or laptop computer 142, a tablet computer, or smart (internet enabled) mobile phone 141, media player 145, etc.

Production application 104 executes on video production computer system 121 (although it may be executed on a laptop, PC tablet, or the like), and allows loading, into database 107, certain data by the producer of the content in the video (any software product which allows for the organization of the desired data may be used, provided it is compatible with database 107).

Database 107 uses application servers 111 to provide the present system service described herein. Servers 111 are accessed by app. 108 which facilitates the interaction by the user, via the Internet, with the present service provided by the service provider system 103. Servers 111 may be directly or indirectly accessible via the Internet, and in one instance may have a front end connected to the Internet by secure servers (not shown), but this is a security issue not relevant to the present system description.

Servers 111 respond to queries from remote application 108 that contain scene/timing metadata 106. The response includes a combination of related costume and/or other merchandise information that is displayed along with links to vendors 135 and related search engine results from search engine 137. Processor 114 executes algorithms 115 used by servers 111 to perform functions described in detail below.

Optional media device remote controller 109 is capable of controlling a particular media device 102. Remote controller 109 may be unnecessary in the event the video is viewed on a personal computer, tablet, or smart phone, in which case the viewer can manipulate control app. 108 to provide results from queries to application servers 111 directly by use of the keyboard and/or mouse attached to or integrated within this device).

The present system does not add metadata to a video 105. The scene and timing metadata 106 in the video 105 is already created when a video is generated. Content producers should not strip this metadata, which is essential for system operation, as explained below.

Production application 104 allows a producer to load, into database 107, per-scene product and corresponding scene indexing information/data 170, hereinafter "scene-indexed product information 170" (or simply "data 170") describing certain items in a particular scene in video 105 that are to be made available to a viewer. Production software 104 is supported by servers 122, so that multiple parties can access the same data at essentially the same time from multiple locations, to support production of video 105. Servers 122 work in coordination with servers 111 that service application 108, and feed the data 170 loaded into application 104, via production support servers 122, to application servers 111. Application 108 can then request the servers to provide the previously downloaded scene-indexed product data 170 that matches the scene or timing data for a particular program/episode/scene Items "placed" in video 105 are directly available to the viewer via a 'smart', or Internet-enabled television interface (e.g., smart TV or 'ITV' 110), or through the additional use of another interactive media device 102, such as a mobile phone, tablet, media player, or a personal computer, provided the device includes communication and control application 108. Such an application-enabled media device 102 that can communicate with an ITV 110 or other primary display device, via the Internet and the system service provider's servers 111, is hereinafter referred to as a "secondary device" 113.

Each media device 102 or secondary device 113 must be capable of receiving and interpreting the broadcast video signal, or the signal in stored video media 140, and it must be able to receive a signal from application 108, via the Internet, so that the application can communicate with servers 111 that support the application. Each such device 102/113 can perform these functions via interaction with an ITV 110, or independently.

Metadata

The ability to locate the exact point of a particular video 105 is based on the use of scene and timing metadata 106 embedded in video 105. This metadata 106 is normally recorded into the video 105 by video production software in current use. The metadata is included in a broadcast of (or playback of media containing) video 105, and is captured by communication and control application 108.

Figure 2A:
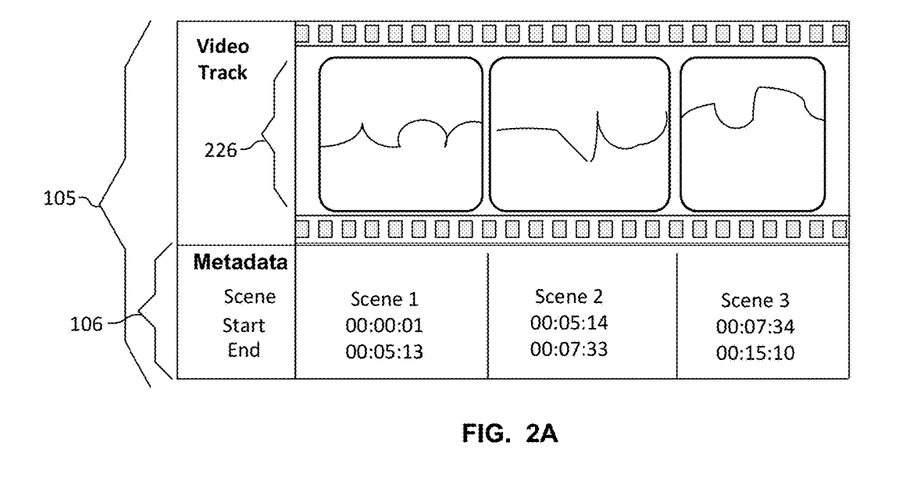
FIG. 2A is an exemplary diagram showing the correspondence between metadata and the video information with which it is associated.

FIG. 2A is an exemplary diagram showing typical correspondence between metadata 106 and the video information 226 with which it is associated. As shown in FIG. 2A, metadata 106 includes content information used to uniquely identify certain aspects of the associated video content (e.g., the movie title, or the program, episode, and scene, as applicable) and the specific place in the video being viewed, i.e., the scene, or a particular point in time within the video.

Each item that is loaded into production software 104 includes program, episode and scene information when it is loaded. Application 108 (subsequently) reads metadata 106 that indicates what scene (or what time into the program, in which case the scene and time into program information has to be loaded into servers 111). Application 108 also reads the scene-indexed product information 170 stored in servers 111 and provides information about a user-selected item for that particular scene.

Metadata 106 is included in the broadcast of video 105, and captured by communication and control application 108 executing in an interactive media device 102. If app. 108 is running on a secondary device 113, then this metadata is transferred via open protocols to the secondary device communicating with the device receiving and/or displaying the video. This metadata contains information to uniquely identify the video and the specific place in the video being viewed. It may include the video name and scene number, or it may include a unique identifier that can be translated into a video name and scene number by the database. Control app. 108 may then connect to the database to search for the corresponding data belonging to that specific video and location within the video. When a corresponding entry is found, the filtered results are displayed.

In one embodiment, system 101 performs functions including adding metadata 106 to, or preserving and potentially encrypting video program/episode/scene metadata 106 along with video content 105/226; loading product-specific data into the service provider's database; receiving corresponding metadata, decoding and interpreting the metadata, in synchronized fashion at the time of engagement, via communication and control application 108.

Upon receiving an inquiry by the viewer (or 'user'), communication and control application 108, using synchronization or timing metadata 106, accesses the previously entered scene-indexed product information 170 from application servers 111. The viewer inquiry triggers an Internet search, and, displaying the item or product in question in retail context on ITV 110 or media device display 210.

Initially, for each scene in video 105, control app. 108 indicates, on the screen, the name of the program, and the characters in the scene, or props, or sets (or other information), depending on the selection made by the viewer. Selecting an item in the scene, such as a character, allows further toggling into details relevant to that item, e.g., a character's wardrobe, which may be broken down into additional details, in the present case, with such categories as "tops" or "bottoms".

The viewer can then continue to toggle into and through the previously entered items in, for example, the wardrobes of the featured characters, or their props and set items. Selection of any of these items displays the item as the results of an Internet search engine search (performed by search engine 137 engaged by servers 111) and a brief description of the item.

The viewer can select from the top (e.g., three) search results appearing as highlighted links to the Internet web pages of vendors who are offering the item for sale. The present system can (over time, as feedback is collected) provide viewer ratings, based on viewer/system user provided feedback for the vendor and/or particular items. The viewer can select a link to learn more, which takes them directly to the vendor's web page for the item, triggering an event, for example. a pay per click ('PPC'). The viewer can toggle to see all vendor results ("view more vendors"), or toggle to see what is available locally ("view local", assuming that the viewer has actively elected to enable this service, which requires their making their location available to the system).

The present system allows viewers the option to toggle in or out of the "view local" function depending on whether or not they prefer to keep their whereabouts confidential. In this manner, the viewer can ultimately toggle and click his or her way to any product available in the database, review peer ratings of items and/or vendors, find out what's available locally, and (if the content provider elects to provide this information) confirm whether or not the product was embedded in the program due to product placement funding or the providing of a free product, or simply to make it available for research or retail sale.

Figure 2B:
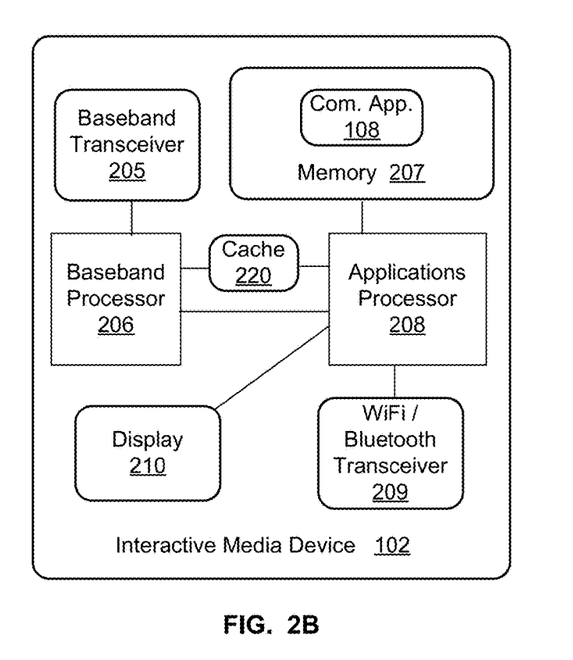
FIG. 2B is a block diagram of exemplary functional components in a typical smartphone or other Internet-enabled media display device.

FIG. 2B is a block diagram of exemplary components in a typical smartphone or other interactive Internet-enabled media device 102, showing device interconnectivity with communication and control application ('control app.') 108. As shown in FIG. 2B, interactive media device 102 typically includes a baseband transceiver 205 for receiving and transmitting information via the Internet, a baseband processor 206, coupled to transceiver 205 and to an applications processor 208 with respective memory 207. Applications processor 208 controls a display 210 and a WiFi or Bluetooth® (or other local communications protocol) transceiver for communication with ITV 110. Communication and control application 108 is stored in memory 207, and executed by applications processor 208 when invoked by a user command or operation.

Communication and control application 108 is set up as a system application which allows for modification to enable it to work with any number of devices that support application software by changes in the application's style sheet. The controlling device 102 on which application 108 resides can be used to toggle over 'buttons' in an overlay (generated by app 108) that indicates the buttons have been selected. When elapsed time into video 105 is synchronized with corresponding metadata 106, control app 108 automatically links to the program being viewed and to the actual scene on the screen at the time. Synchronization of elapsed time into video 105 with corresponding metadata 106 is necessary to allow specific identification of the scene of interest.

In an exemplary embodiment, control app. 108 displays a screen overlay, accessed by a remote controller 112 (or mouse, with a computer). The user can toggle over 'buttons' in the overlay that, in one embodiment, glow more brightly when selected. When a button is selected, control application 108 is activated, and automatically links to the program being viewed and to the metadata 106 corresponding to the actual scene on the screen at the time.

The current metadata 106 is then sent by application 108 to servers 111, which identify the current scene, using the received metadata. Using metadata 106 sent from application 108 running in a media device receiving or playing a video 105, servers 111 determine a corresponding scene, and then respond with the scene-indexed product information 170, previously loaded into database 107, corresponding to that scene. Servers 111 then send matching product data in the current scene back to application 108. The user then may send a query for specific items in the received matching data, for which servers 111 provide product data matching the user query The user may select an item from the current scene or may toggle back and forth between scenes and episodes. For each scene clicked on by the user, control application 108, in conjunction with application servers 111, generates information on the screen of media device 102 indicating, for example, the name of the program, and the characters in the scene, or other information such as 'set and scenery'. More specifically, servers 111 locate this information by searching scene-indexed product information 170 on database 107. Selection of set and scenery takes the user, via a link, supplied by servers 111, to an Internet web page displaying these products, or the user may choose a character in the scene, for which information, located on the Internet, may be displayed.

At a lower object selection level, control application 108 displays choices including, for example, top, bottom, dress, shoes, accessories, outerwear, and/or other products. Selection of any of these will bring up the embedded products, "placed" or not, and our user can select from the top three search results appearing as highlighted links with the name of the vendor, with their "user rating" and a brief description of the product. The user can toggle to see more detail on vendor ratings, or they can select a link to learn more, triggering a pay per click payment from a vendor. In addition, the user can toggle to see all vendor results ('view more vendors'), or toggle to see what is available locally ('view local'). In this manner, the user can ultimately toggle and click his or her way to any embedded product within the present system and confirm whether or not the product was embedded in the program due to product placement funding or the providing of a free product, or simply to make it available for research or retail sales.

Broadcast Embodiment

Figure 3:
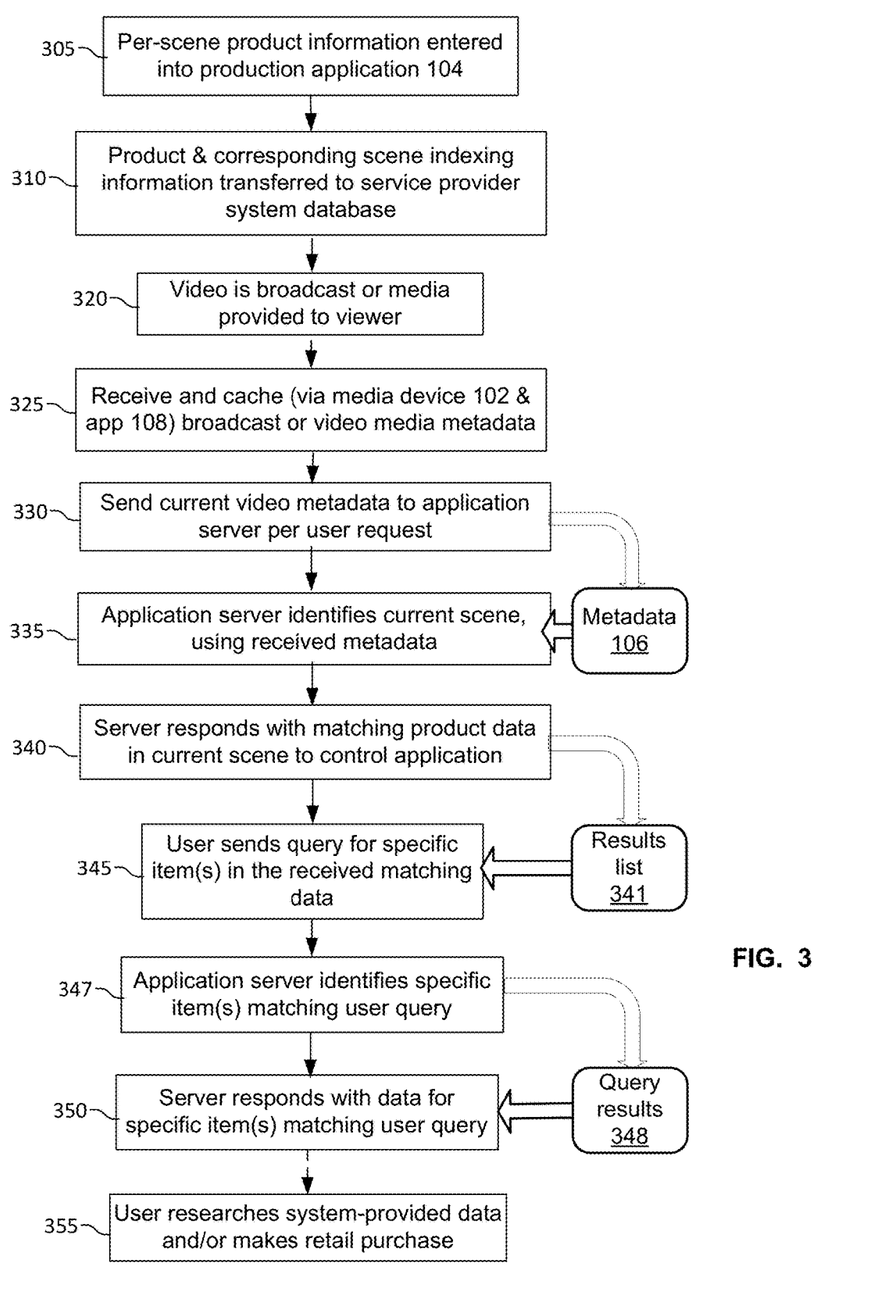
FIG. 3 is a flowchart showing an exemplary set of steps performed in one embodiment of the present system.

FIG. 3 is a flowchart showing an exemplary set of steps performed by the present system in a typical broadcasting embodiment. As shown in FIG. 3, at step 305, a content producer enters per-scene product and corresponding scene-indexed product information 170, for example, costume/prop/set information (or other product information relating to specific scenes or other sections in video 105) into production software application 104. Application 104 runs, for example, on video production system 121 (although it may be executed on a laptop, PC, or tablet, or the like), and organizes and formats the data 170 in a format suitable for use by the service provider system 103. This scene-indexed product information 170 includes specific identification information, such as, in the case of an article of clothing, the brand, the name of that item, the name of the actor wearing it, the name of the character wearing it, and the scene in which it is worn.

Scene/timing metadata 106 already existing on video 105 is allowed to remain in the video. This metadata is typically already in the original edited video data, and may be encrypted or removed by the content producers. To the extent that the metadata is encrypted, the information required to decode this metadata is provided in advance to the service provider system 103. The present method uses existing metadata 106 on a video 105 to correlate with the costume and/or other data, etc., provided by content creator (120).

At step 310, the per-scene product and corresponding scene indexing information/data 170 is electronically transferred to service provider system servers 111, where that data is entered into database 107.

At step 320, video 105 including metadata 106 is broadcast, or in an alternative embodiment, computer-readable video media 140 is provided to a viewer.

At step 325, an interactive media device 102 (shown in FIG. 2) receives the broadcast video 105 including metadata 106 (which is cached temporarily) and transfers the metadata to control application 108, which is resident on the device 102. While the broadcast is viewed by the viewer on ITV 110 or other interactive media device 102, resident communication and control app. 108 locates and temporarily stores (in, e.g., local memory 207) the metadata received in the broadcast video 105.

At step 330, using a remote controller 109, smartphone 141, tablet 142, or other secondary device 113, a user/viewer clicks on a button shown on display 210 (such as "click to select the present scene"), in response to which, the current scene or elapsed-time-into-the-video (timing) metadata 106 is extracted from video 105 and then sent to servers 111, by application 108, to allow identification of the present scene or segment in video 105. This metadata 106 is then temporarily stored in database 107 or other repository.

At step 335, application servers 111 then identify the current program, episode, and/or scene, using the current scene/timing metadata 106 received from application 108 to locate and provide previously entered scene-indexed product information 170 for the specifically identified scene that matches the scene identifier or the present video timing.

There are two potential methodologies for correlating scenes in a video 105 with data 170 relating to those scenes. In the first methodology, video 105 has accompanying metadata 106 which continually indicates which scene is being viewed at any given moment. For example, with each frame of video 105, there is an accompanying segment of scene metadata 106 that is received and interpreted by media device 102, via communication and control application 108.

In the second methodology, the accompanying metadata 106 indicates the point in elapsed time in a program, relative to the frame to which it applies. For example, a given video frame may have metadata 106 indicating it is seven minutes, fifty two seconds into the program. The information (i.e., data describing timing corresponding to each scene) is pre-loaded into service provider database 107 and later compared with timing metadata 106 sent from application 108 (running on a media device 102) for identifying selected scenes in video 105.

At step 340, once scenes in video 105 have been correlated with scene-indexed product information 170 relating to those scenes, servers 111 then respond back to application 108 with a results list 341 including matching product data comprising a list of items in that particular scene for which scene-indexed product information 170 is available.

At step 345, the viewer toggles through the results list to identify the item(s) to be researched and/or considered for purchase. The viewer selects the desired item(s) by highlighting/toggling to a displayed item, and ultimately clicks on the item of interest, to generate, via application 108 and the Internet, a query for related product information 170 in database 107.

At step 347, application servers 111 provide query results 348 identifying one or more specific items in database 107 matching the user query. In one embodiment, items are prioritized, based on auction results using, for example, a simplified pay per click model with a single prioritization approach based on highest to lowest bidder.

At step 350, servers 111 respond with data for the specific item(s) matching the user query. The response may include a combination of related costume and/or other merchandise information (106) that is displayed along with links to vendors (135) and/or related results from search engine 137.

At step 355, the viewer may review the query results and research further, and may also click on a link (provided with the query results) to go directly to a vendor's web site 135 (also provided with the query results) for the selected item, to view the item/pricing, and/or to make a retail purchase. The viewer may then continue into the system database 107 to search for any previously entered scene-indexed product information 170 to continue researching or shopping.

Broadcast and Previously Recorded Media

In a broadcast and previously recorded media embodiment, the broadcast is received by viewer on a smart television set 110 or other viewing device 102 and stored locally. In this pre-recorded mode, the viewer uses a television program video recording device (digital video recorder or DVR), such as a Tivo® box, to record the program. When the viewer elects to play back the recorded video 105, steps 325 through 350, as described with respect to FIG. 3, are applicable as with a live viewing of the video.

Use Directly on Personal Computer or Tablet, with Internet-Based Broadcasts

In an alternative embodiment, using a DVR in playback mode, video 105 and accompanying metadata 106 may be received directly via the internet.

Communication and Control Application

Figure 4:
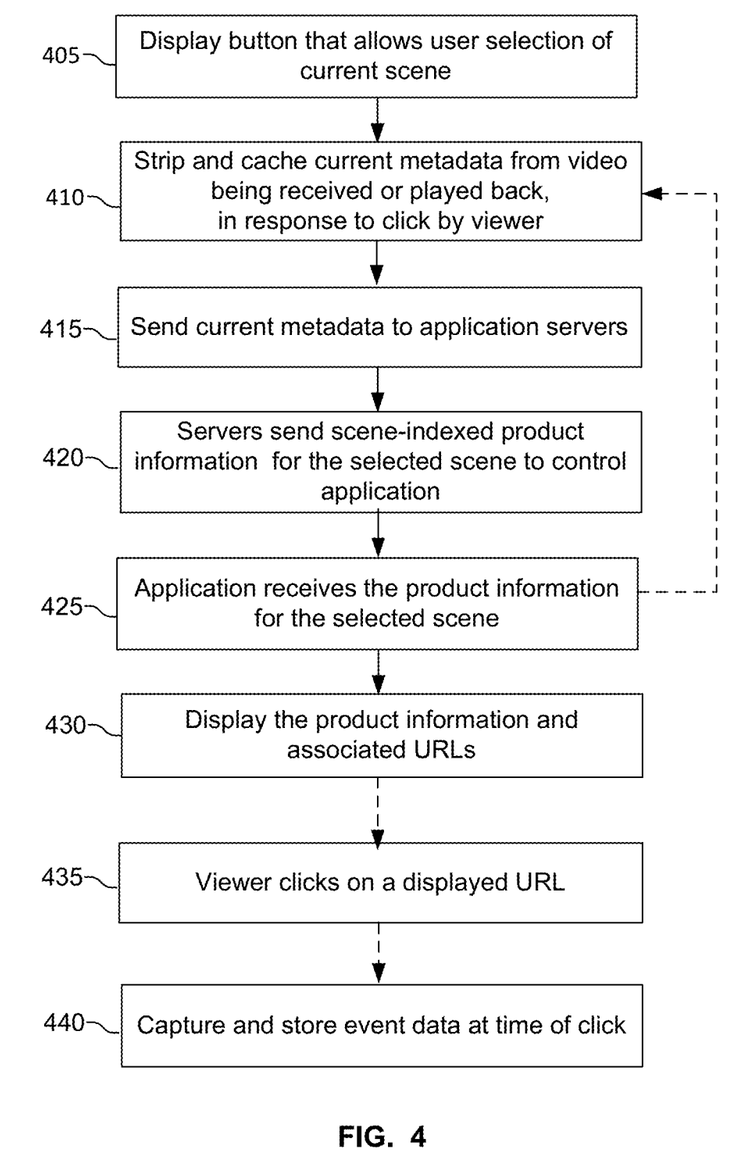
FIG. 4 is a flowchart showing an exemplary set of steps performed by the communication and control application.

FIG. 4 is a flowchart showing an exemplary set of steps performed by the communication and control application 108, being executed by an applications processor 208 on a typical interactive media device 102, such as that shown in FIG. 2B. As shown in FIG. 4, at step 405, application 108 displays a button (or the like) on interactive media device 102, that when clicked on, indicates that the viewer is interested in one or more items shown in the current scene.

At step 410, in response to a click (on the button) by the viewer, application 108 strips and caches current metadata 106 from video 105 being received (or played back). A command, such as "getCurrentTimingInfo( )", is issued by the application to baseband processor 206 to facilitate retrieval of the current scene/timing data from cache 220, with a response consisting of either a video identifier+timestamp, or a video identifier+scene identifier. In either case, this returned data is used as a key to provide to the application servers 111 in the following step.

At step 415, application 108 sends current metadata 106 to application servers 111. A command, such as "getProductAndSceneInfo(videoIndexingKey)", is issued by the application to servers 111, to elicit a response including a data object that contains scene-indexed product information 170, and optionally, a human-readable name for the scene identified by the current metadata 106.

At step 420, in response to the command issued by application 108, servers 111 send the scene-indexed product information 170 for the selected scene, and at step 425, application 108 receives the product information 170 for the selected scene. Steps 410 through 425 may be repeated to keep the system state up to date. At step 430, application 108 displays the product information 170, including associated URLs.

At step 435, the viewer may then click on a displayed URL, to purchase a selected item, or to engage in research related to the item. In step 440, in one embodiment, application 108 may also capture and store event data when the user clicks on a displayed URL, so that the event is recorded to support a pay-per-click or other advertising/economic model.

Certain changes may be made in the above methods and systems without departing from the scope of that which is described herein. It is to be noted that all matter contained in the above description or shown in the accompanying drawings is to be interpreted as illustrative and not in a limiting sense. The elements and steps shown in the present drawings may be modified in accordance with the methods described herein, and the steps shown therein may be sequenced in other configurations without departing from the spirit of the system thus described. The following claims are intended to cover all generic and specific features described herein, as well as all statements of the scope of the present method, system and structure, which, as a matter of language, might be said to fall therebetween.

What is claimed is:

1. A method, implemented by a computer, for a user to automatically identify an item in a video program recorded by a producer on media on which metadata associated with the program has also been recorded, wherein the metadata consists essentially of a scene number in the program corresponding to a current scene in the program being viewed, and the metadata was recorded on the media at the same time as the video program the method comprising:
- storing, by the producer at the same time the video program is recorded, in a database accessible by the computer, scene-indexed product information identifying the item and indicating a correspondence between the item and the scene number of the current scene in which the item appears;
- receiving the metadata associated with the current scene;
- storing the received metadata in the database;
- identifying the current scene in the video program by reference to the scene number in the metadata stored in the database; and
- identifying the item in the current scene by correlating the identified current scene with the scene-indexed product information stored in the database;
- wherein a computer application, stored in memory coupled to the computer, performs at least the steps of identifying the current scene and identifying the item therein, the computer application being executed by the computer; and
- wherein the metadata is not modified subsequent to the video program being recorded on the media.

2. The method of claim 1, wherein the scene-indexed product information indicates a correspondence between the scene number in which the item appears, and a plurality of items appearing in the corresponding scene, and wherein the step of identifying the item comprises identifying a plurality of items, the method further comprising:
- sending, to the computer application, a list of items in the current scene being viewed;
- receiving, from the computer application, a request for data corresponding to one or more of the items in the list; and
- sending, to the computer application, the data for the one or more items in the list.

3. The method of claim 1, wherein the computer application further:
- triggers an internet search to identify at least one vendor offering the identified item for sale; and
- presents on a display at least one identified vendor.

4. The method of claim 3, wherein the computer is an Internet-enabled television set, and wherein the Internet-enabled television set displays the video program and displays the at least one identified vendor.

5. The method of claim 1, wherein:
- the computer is a secondary device in communication with a primary display device;
- the primary display device displays the video program; and
- the computer application triggers an internet search to identify at least one vendor offering the identified item for sale.

6. The method of claim 1, wherein the item in the current scene is an article of clothing.

7. The method of claim 1, wherein the video program is a television program.

8. A method, implemented by a computer, for automatically identifying an item in a video program recorded by a producer on media on which metadata associated with the program has also been recorded, wherein the metadata consists essentially of scene timing information of a current scene in the program being viewed, the scene timing information indicating the elapsed time into the video program, and being recorded on the media at the same time as the video program, the method comprising:
- storing, by the producer at the same time the video program is recorded, in a database accessible by the computer, scene-indexed product information identifying the item and indicating a correspondence between the item and the scene number of the current scene in which the item appears;
- receiving the metadata associated with the current scene;
- storing the received metadata in the database;
- identifying the current scene in the video program by reference to the scene timing information in the metadata stored in the database; and
- identifying the item in the current scene by correlating the identified current scene with the scene-indexed product information stored in the database;
- wherein a computer application, stored in memory coupled to the computer, performs at least the steps of identifying the current scene and identifying the item therein, the computer application being executed by the computer; and
- wherein the metadata is not modified subsequent to the video program being recorded on the media.

9. The method of claim 8, wherein the scene-indexed product information indicates a correspondence between the scene timing information and a plurality of items appearing in the corresponding scene, and wherein the step of identifying the item comprises identifying a plurality of said items, the method further comprising:
- sending, to the computer application, a list of items in the current scene being viewed;
- receiving, from the computer application, a request for data corresponding to one or more of the items in the list; and
- sending, to the computer application, the data for the one or more items in the list.

10. The method of claim 8, wherein the computer application further:
- triggers an internet search to identify at least one vendor offering the identified item for sale; and
- presents on a display at least one identified vendor.

11. The method of claim 10, wherein the computer is an Internet-enabled television set, and wherein the Internet-enabled television set displays the video program and displays the at least one identified vendor.

12. The method of claim 8, wherein:
- the computer is a secondary device in communication with a primary display device;
- the primary display device displays the video program; and
- the computer application triggers an internet search to identify at least one vendor offering the identified item for sale.

13. The method of claim 8, wherein the item in the current scene is an article of clothing.

14. The method of claim 8, wherein the video program is a television program.

15. A method, implemented by a computer, for automatically identifying an item appearing in a video program recorded on media by a producer on which metadata associated with the program is also recorded at the same time as the video program, wherein the metadata includes a scene attribute in the program corresponding to a current scene in the program being viewed, the scene attribute being at least one of a scene number and scene timing information, the method comprising:

storing, by the producer at the same time the video program is recorded, in a database accessible by the computer, scene-indexed product information identifying the item and indicating a correspondence between the item and the scene attribute of the current scene in which the item appears;

receiving the metadata associated with the current scene;

storing the received metadata in the database;

identifying the current scene in the video program by reference to the scene attribute in the metadata stored in the database; and identifying the item in the current scene by correlating the identified current scene with the scene-indexed product information stored in the database;

wherein a computer application, stored in memory coupled to the computer, performs at least the steps of identifying the current scene and identifying the item therein, the computer application being executed by the computer; and wherein information about the item appearing in the video program is not embedded in the video program.

16. The method of claim 15, wherein the computer application further:

triggers an internet search to identify at least one vendor offering the identified item for sale; and presents on a display at least one identified vendor.

17. The method of claim 16, wherein the computer is an Internet-enabled television set, and wherein the Internet-enabled television set displays the video program and displays the at least one identified vendor.

18. The method of claim 15, wherein:

the computer is a secondary device in communication with a primary display device;

the primary display device displays the video program; and the computer application triggers an internet search to identify at least one vendor offering the identified item for sale.

19. The method of claim 15, wherein the item in the current scene is an article of clothing.

20. The method of claim 15, wherein the video program is a television program.

21. A method, partially implemented by a computer, for automatically identifying an item in a video program, comprising:

recording, on media, a video program;

recording, on the media at the same time as the video program is recorded, metadata associated with the program, wherein the metadata consists essentially of a scene number in the program corresponding to a current scene in the program being viewed;

storing, in a database accessible by the computer at the same time as the recording steps, scene-indexed product information identifying the item and indicating a correspondence between the item and the scene number of the current scene in which the item appears;

receiving the metadata associated with the current scene;

storing the received metadata in the database;

identifying the current scene in the video program by reference to the scene number in the metadata stored in the database; and identifying the item in the current scene by correlating the identified current scene with the scene-indexed product information stored in the database;

wherein a computer application, stored in memory coupled to the computer, performs at least the steps of identifying the current scene and identifying the item therein, the computer application being executed by the computer;

wherein the metadata is not modified subsequent to the video program being recorded on the media; and wherein the recording steps are executed by a single party.

* * * * *